(12) United States Patent
D'Souza

(10) Patent No.: US 7,092,745 B1
(45) Date of Patent: Aug. 15, 2006

(54) PORTABLE ELECTRONICS DEVICE WITH VARIABLE SOUND OUTPUT

(75) Inventor: Winand D'Souza, Bracknell (GB)

(73) Assignee: Nokia Mobile Phones Limited, Espoo (FI)

( * ) Notice: Subject to any disclaimer, the term of this patent is extended or adjusted under 35 U.S.C. 154(b) by 11 days.

(21) Appl. No.: 09/684,949

(22) Filed: Oct. 10, 2000

(30) Foreign Application Priority Data

Oct. 8, 1999 (GB) ................................. 9923957

(51) Int. Cl.
*H04M 1/00* (2006.01)

(52) U.S. Cl. ............................. 455/575.1; 455/569.1; 455/575.3; 455/575.4; 455/550.1; 455/570; 455/90.3; 379/420.01; 379/420.02; 379/420.04; 379/428.01

(58) Field of Classification Search .. 455/575.1–575.9, 455/550.1, 569.1–569.2, 570, 90.1–90.3; 379/419, 422, 428.01, 429, 433.01, 420.01–420.04
See application file for complete search history.

(56) References Cited

U.S. PATENT DOCUMENTS

| | | | | |
|---|---|---|---|---|
| 5,138,663 A | * | 8/1992 | Moseley ..................... | 381/71.6 |
| 5,379,338 A | * | 1/1995 | Umemoto et al. .......... | 455/570 |
| 5,537,472 A | * | 7/1996 | Estevez-Alcolado et al. .... | 379/433.02 |
| 5,615,259 A | * | 3/1997 | Gilbert .................. | 379/433.13 |
| 5,790,679 A | | 8/1998 | Hawker et al. | |
| 5,896,461 A | * | 4/1999 | Faraci et al. ................. | 381/386 |
| 6,002,949 A | * | 12/1999 | Hawker et al. ............. | 455/569 |
| 6,292,563 B1 | * | 9/2001 | Clark et al. ............ | 379/433.13 |
| 6,292,573 B1 | * | 9/2001 | Zurek et al. ................. | 381/386 |
| 6,314,183 B1 | * | 11/2001 | Pehrsson et al. ........ | 379/433.06 |
| 6,381,447 B1 | * | 4/2002 | Eguchi ........................ | 455/90 |

FOREIGN PATENT DOCUMENTS

| | | |
|---|---|---|
| EP | 0651546 A1 | 5/1995 |
| EP | 0776115 A2 | 5/1997 |
| EP | 0 903 909 A1 | 3/1999 |
| GB | 2337395 A | 11/1999 |
| WO | WO09747117 | * 11/1997 |
| WO | WO 9747117 | 12/1997 |

* cited by examiner

*Primary Examiner*—Steve M. D'Agosta
(74) *Attorney, Agent, or Firm*—Alston & Bird LLP

(57) ABSTRACT

A portable device including a housing and an electro-acoustic transducer. The housing has a first surface with an outlet for the egress of an acoustic signal when in a loudspeaker mode and a second surface with an outlet for the egress of an acoustic signal when in an earpiece mode. The electro-acoustic transducer is located within the housing and converts an electrical signal input to the transducer into an acoustic signal. The transducer is operable to output acoustic signals when in the loudspeaker mode or the earpiece mode, the audio path between the transducer and the outlet for the egress of an acoustic signal when in the loudspeaker mode being less attenuated than the audio path between the transducer and the outlet for the egress of an acoustic signal when in the earpiece mode.

29 Claims, 4 Drawing Sheets

PORTABLE ELECTRONICS DEVICE WITH VARIABLE SOUND OUTPUT

BACKGROUND OF THE INVENTION

Field of the Invention

This invention relates to a portable electronics device incorporating an electro-acoustic transducer.

A transducer is a device that converts energy from one medium to another. The invention is particularly directed to an electro-acoustic transducer, which converts an electrical signal into an acoustic signal.

SUMMARY OF THE INVENTION

In accordance with the invention there is provided a portable device comprising: a housing having a first surface with an outlet for the egress of an acoustic signal when in a loudspeaker mode and a second surface with an outlet for the egress of an acoustic signal when in the earpiece mode; and an electro-acoustic transducer located within the housing for converting an electrical signal input to the transducer into an acoustic signal, the transducer being operable to output acoustic signals when in the loudspeaker mode or the earpiece mode, the audio path between the transducer and the outlet for the egress of an acoustic signal when in the loudspeaker mode being less attenuated than the audio path between the transducer and the outlet for the egress of an acoustic signal when in the earpiece mode.

Such an arrangement means that a single transducer may be used for providing both the loudspeaker mode (i.e. an acoustic output at a level suitable for listeners in the general vicinity of the device) and the earpiece mode (i.e. an acoustic output at a level suitable for a single listener with the device near to the listeners ear), which therefore saves space within the device. In addition, the higher attenuation between the earpiece outlet and the transducer relative to that between the loudspeaker outlet and the transducer means that a user who places the earpiece outlet to their ear while the device is in loudspeaker mode will be subjected to a quieter output than that from the loudspeaker outlet.

The invention has particular application to communications devices which incorporate telephony functionality but is also applicable to other portable devices which may operate in a "personal" earpiece mode and a loudspeaker mode (e.g. a personal stereo).

The device may incorporate a first housing and a second housing coupled together in a moveable manner. Preferably the device further includes a detector for detecting the position of one housing relative to the other and for operating the gain control switch accordingly.

A mechanical attenuator may be provided between the transducer and the outlet for the egress of the acoustic signal when in the earpiece mode;

The device may also include an amplifier for amplifying the electrical signal prior to its input to the transducer and a gain control for controlling the gain of the amplifier. The gain control is preferably operable to increase the gain of the amplifier when the device is to operate in a loudspeaker mode relative to the gain of the amplifier when the device is in an earpiece mode. Preferably the difference in gain between the two modes is around 30 dB.

BRIEF DESCRIPTION OF THE DRAWINGS

The invention will now be described, by way of example only, with reference to the accompanying drawings in which.

DETAILED DESCRIPTION OF THE DRAWINGS

Figure 1:
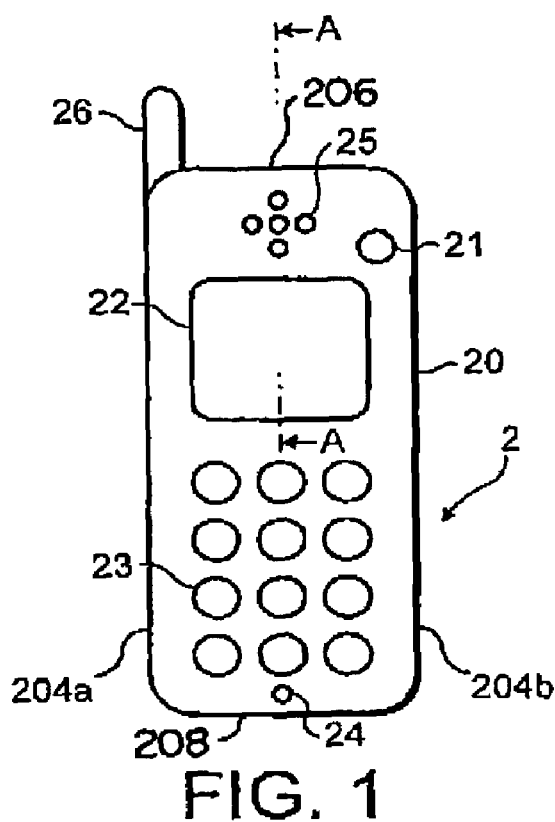
FIG. 1 shows a first embodiment of a portable device in accordance with the invention.

As shown in FIG. 1, a portable communications device 2 according to a first embodiment of the invention generally incorporates a main housing 20. The main housing has a front face 201, a rear face 202, side faces 204a,b, a upper side face 206 which forms the top of the device and a lower side face 208 which forms the bottom side of the device. The device has a display 22, a user input device in the form of an alphanumeric keypad 23 and an antenna 26. The front face 201 of the housing has an inlet 24 for the ingress of an acoustic signal to a microphone and an outlet 25 for the egress of an acoustic signal from an earpiece to a users ear. The rear face 202 of the housing has an outlet 27 (see FIG. 2) for the egress of an acoustic signal when the device is used in a loudspeaker, or so-called hands-free, mode. The device includes a button 21 with which a user selects the hands-free mode.

Figure 2:
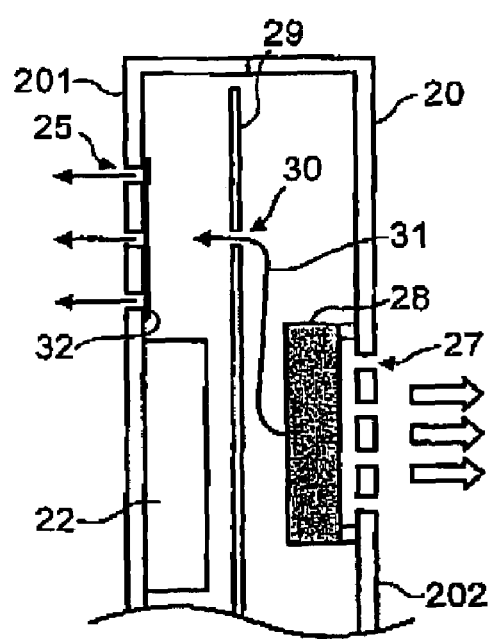
FIG. 2 shows a cross-sectional view along line A—A of the device shown in FIG. 1.

FIG. 2 shows a cross-sectional view along the line A—A of the device shown in FIG. 1. The device includes a multi-functional electro-acoustic transducer 28. The transducer is multi-functional in that it provides the acoustics for at least the hands-free mode and the earpiece mode. The transducer may be a loudspeaker. The transducer may also provide buzzer and/or vibrating functions. An example of such a transducer 28 is the CMS-ISA multifunction transducer from Citizen™. This transducer provides earpiece, hands-free, buzzer and vibration functions.

The transducer 28 is provided adjacent the outlet 27 so as to provide a relatively unimpeded acoustic path from the transducer to the outlet 27 compared with the acoustic path from the transducer to the outlet 25. The face of the transducer that provides the major acoustic output faces the outlet 27. Preferably the transducer is attached directly to the inside surface of the rear face 202 of the housing, adjacent the outlet 27.

The acoustic path from the transducer to the earpiece outlet 25 is restricted so as to output an attenuated acoustic signal from the earpiece outlet 25. This may be achieved by restricting the open area of the aperture 30 and outlet 25. Typically the area of the aperture 30 and the outlet 25 is significantly smaller than the open area of the hands-free outlet 27. A printed circuit board (POB) 29, on which are mounted the electronics of the device, is housed within the housing 20 and generally between the transducer 28 and the earpiece outlet 25. An aperture 30 is formed in the PCB 29 on a level with the earpiece outlet 25, to provide a restricted acoustic path 31 from the rear of the transducer 28 to the earpiece outlet 25.

An acoustic attenuator 32 may be provided adjacent the earpiece 25 to attenuate the acoustic signal from the transducer 28 to a level suitable for the earpiece.

Thus a single transducer may be used to provide both the output to the earpiece outlet 25 and the hands-free outlet 27. The audio path from the transducer 28 to the earpiece outlet 25 is designed so as to attenuate the audio output from the transducer sufficiently compared with the audio output which reaches the hands-free outlet 27.

Figure 3:
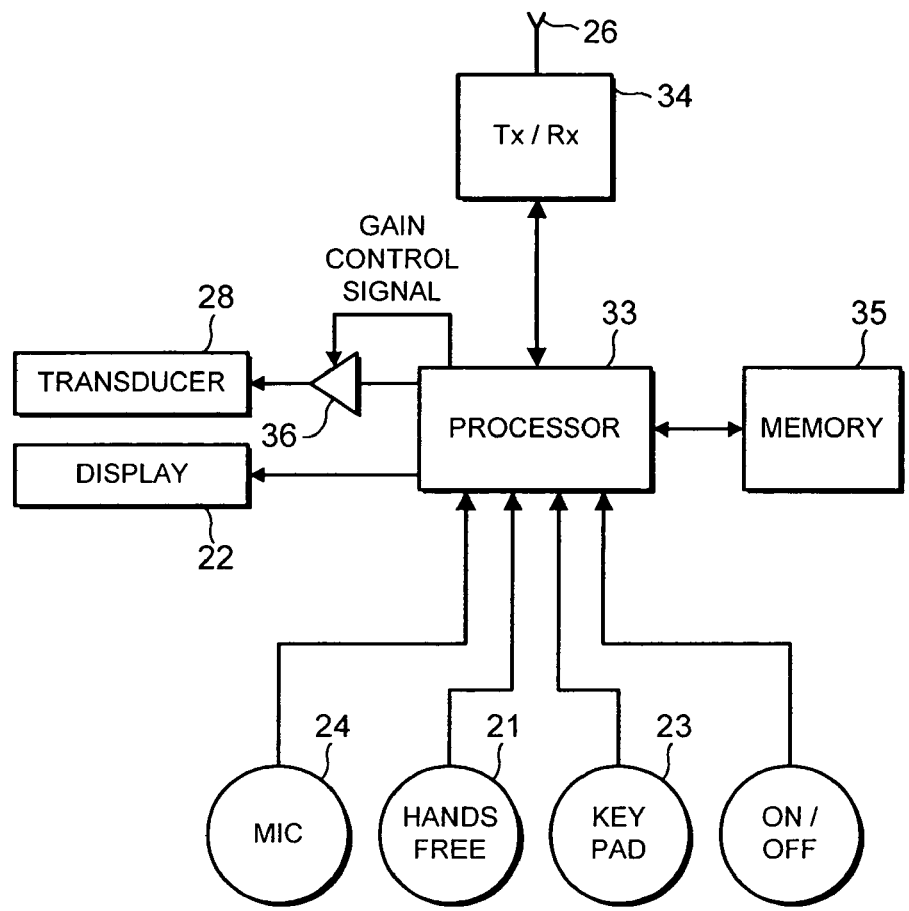
FIG. 3 is a schematic diagram of the electronic components of the device in accordance with the invention.

FIG. 3 is a schematic illustration of the phone 2. The phone 2 has the previously described antenna 26, hands-free button 21, input device (keypad) 23, microphone 24, display 22, and transducer 28. In addition the phone has a processor 33, a transceiver 34 and a memory 35. The antenna 26 is connected to the transceiver 34. The transceiver has reception circuitry for receiving radio frequency signals encoded with data. It processes the received signals as is known in the art to provide the data in digital form to the processor 33. This data may be a voice message or part of a phone conversation in which case the processor controls the transducer 28 to provide an audible output to the user. Alternatively the data may be part of an alphanumeric message in which case the processor 33 is operable to provide the message on the display. The transceiver has transmission circuitry which is provided with digital data from the processor 33 which may have been input via the microphone 24 or via the input device 23 as alphanumeric characters. The transmission circuitry produces radio frequency signals encoded with that data. The processor is connected to memory 35 to which it can write and from which it can read. The memory 35 typically stores software, which controls the functioning of the processor and the phone. In particular the software controls how the processor responds to inputs and what outputs it provides.

The processor is connected to the display 22 and to the transducer 28. It controls the output provided by these devices.

The processor is arranged to receive an input from the microphone 24, the input device (keypad) 23, an on/off button (not shown), and the hands-free button 21.

As shown in FIG. 3, when the button 21 is operated to select hands-free, a gain control signal is sent from the processor 33 to a power amplifier 36. This increases the gain of the power amplifier 36 and so increases the amplitude of the acoustic signal output by the transducer 28. Typically the difference in gain between the earpiece mode and the hands-free mode is around 30 dB.

When the user de-selects the hands-free mode, by operating the key 21, the gain control signal is switched off which reduces the gain of the power amplifier 36.

Figure 3A:
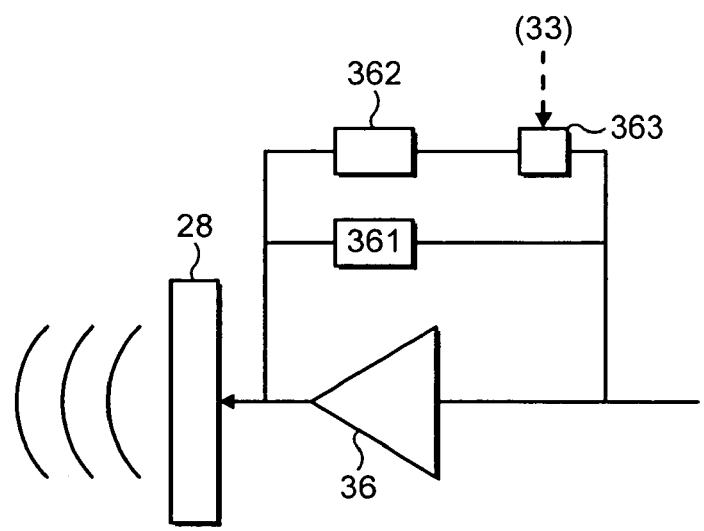
FIG. 3a is an exemplary gain control circuit.

FIG. 3a shows in more detail an example of a gain control circuit associated with the transducer 28. The feed back loop of the power amplifier 36 comprises two resistors 361, 362 and a switch 363. When the gain of the power amplifier is to be decreased, the gain control signal from the processor 33 causes the switch 363 to close and so connect resistor 362 into the feedback loop.

Figure 4:
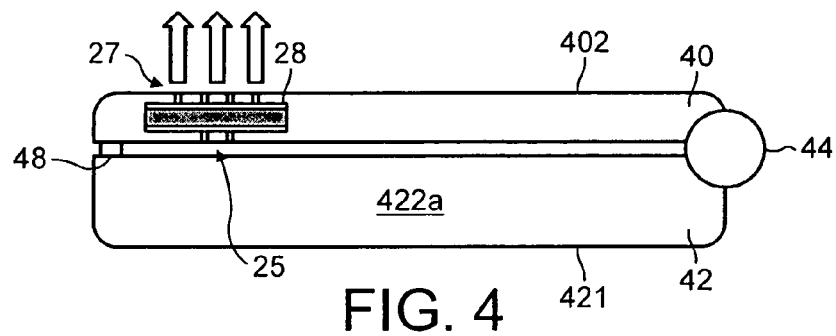
FIG. 4 shows a side view of a second embodiment of a device according to the invention having a hinged portion, the device being in a closed position.
Figure 5:
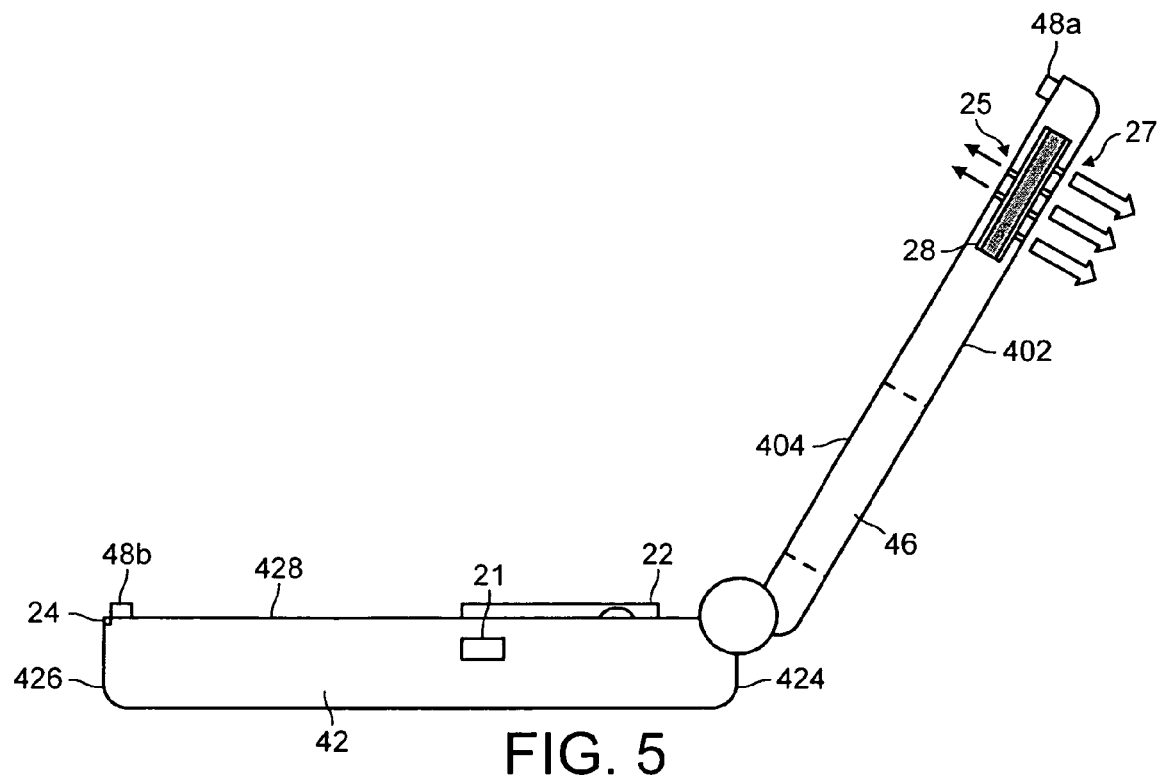
FIG. 5 shows the device of FIG. 4 in an open position.

FIGS. 4 and 5 illustrate a second embodiment of a portable communications device in accordance with the invention. The phone has a body portion 42 and a cover portion 40 connected by a hinge 44. The cover is movable between a closed position as illustrated in FIG. 4 and an open position as illustrated in FIG. 5.

The body portion 42 includes a back face 421 which forms the back of the phone, lateral side faces 422a and an opposed side face (not illustrated) which form the sides of the phone, an upper side face 424 which forms the top side of the phone, a lower side face 426 which forms the bottom side of the phone, and a front face 428 which is exposed when the cover is in the open position and concealed when the cover is in the closed position. The body has: an antenna on its upper side face 424; a microphone 24 on its lower side face 426; and a display 22, a user input device and a hands-free button 21 on its front face 428. The button may be actuated by a user.

The cover portion 40 has an exterior surface 402, which is accessible when the cover is in the closed position, and an interior surfaces 404, which is inaccessible when the cover is in the closed position but is exposed when the cover is in the open position. The transducer 28 is provided in the cover 40 and the display is provided in the body 42. The cover portion has on its exterior surface 402 an outlet 27 for the hand-free acoustics. The cover portion has on its interior surface 404 an outlet 25 for the earpiece acoustics.

As in the first embodiment, the acoustic path from the transducer 28 to the earpiece outlet 25 is attenuated more than that from the transducer 28 to the hands-free outlet 27. In the example shown this is achieved by the total open area of the outlet 25 being less than that of the total open area of the outlet 27. Again apertures in the PCB between the transducer and the earpiece outlet may attenuate the acoustic output from the transducer.

As in the first embodiment a key 21 may be provided for the user to select hands-free mode. A gain control signal is generated in response to a user selecting hands-free mode by pressing the hands-free button 21. Additionally or alternatively a gain control signal may be generated in response to the output of a detector 48. This detector 48 comprises a contact 48a on the inner surface of the first housing 40 and a contact 48b on the inner surface of the second housing 42. When the two contacts 48a, 48b are in contact (as shown in FIG. 4) the device is arranged to be in hands-free mode and when the contacts are not in contact (as shown in FIG. 5) the device is arranged to be in earpiece mode. Thus, when the device is closed, as shown in FIG. 4, gain of the power amplifier is increased and hence the output of the transducer is increased to a level suitable for hands-free operation.

When the device is opened, as shown in FIG. 5, the contacts 48a, 48b separate, which causes the switch 363 to change position and so switch out the extra gain. The gain to the power amplifier 36 is therefore decreased and so the amplitude of the output of the transducer is decreased.

Preferably the hands-free key 21 is arranged so that a user may use this key 21 to over-ride the detector 48 and select hands-free when the device is in the open position. This may be useful if a user wishes to use other functions of the phone (for example, calendar, notebook etc.) when the device is in a position in which earpiece mode is the default.

An aperture 46 is provided in the cover 40 to allow a user to view the display 22 when the device is closed. The aperture is positioned and sized so that when the cover is in the closed position at least a portion of the display 22 is visible through the aperture 46 to the user. The aperture may be covered with a transparent material to allow the user to see the portion of the display 22.

When the cover is in the closed position, the interior surface 404 of the cover 40 abuts with the front face 428 of the body 42. The cover is arranged and sized to enclose the input device 23 and display 22 to prevent access by the user. A portion of the display 22 may, however, be viewed by a user through the aperture 45.

When the cover is in the open position, the front face 428 of the body and the interior surface 404 of the cover 40 form an oblique angle of between 135 and 175 degrees. In this configuration the whole of the display 22 is exposed, the user input device 23 is exposed and the microphone 24 on the lower side face 426 of the body 42 and the outlet 25 on the interior surface 404 of the cover 40 are at their maximal separation.

A button (not illustrated) may be provided to open the cover, for instance by mechanical action. The natural or low energy configuration for the phone is when the cover is open. The cover is biased to be in the open position. When a user closes the cover, the cover is rotated on its hinge 44 against that bias and the cover 40 and body 42 are brought into contact. The cover 40 is latched in this closed position. Activating the open cover button releases the latch and the cover springs open.

Figure 6:
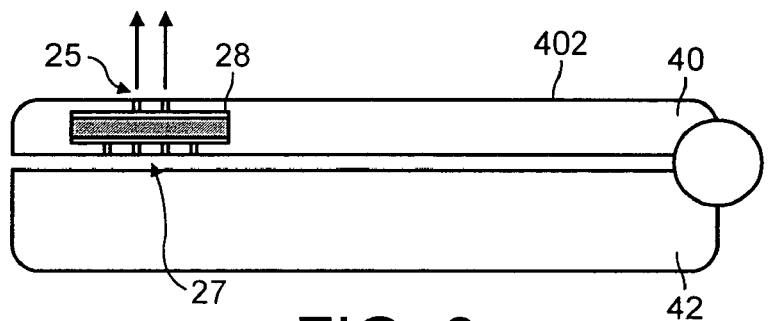
FIG. 6 shows a third embodiment of a device according to the invention.
Figure 7:
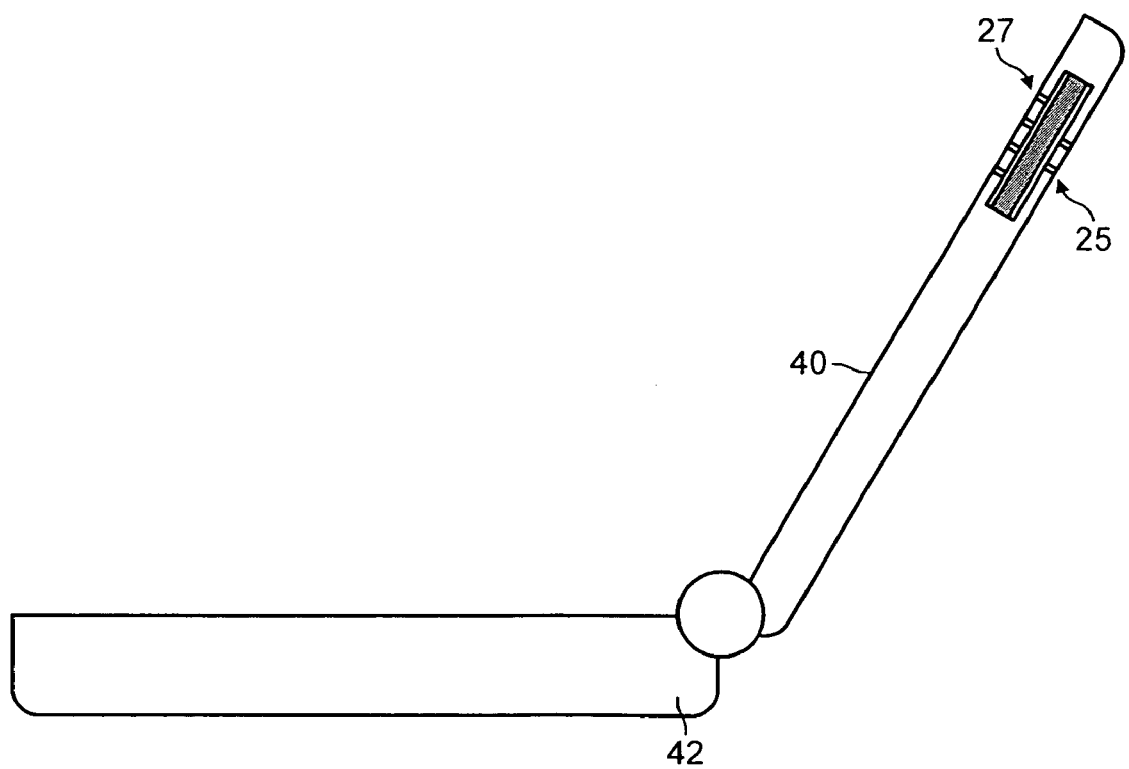
FIG. 7 shows the device of FIG. 7 in an open position.

FIGS. 6 and 7 show a further embodiment of a device according to the invention. Such a device is similar to the Nokia Communicator range of portable communications devices, in which the device is usually in earpiece mode when the device is closed and in hands-free mode when the device is open. The device of FIG. 6 differs from that shown in FIG. 4 in that the outlet 25 for the earpiece mode is provided in the outer surface 402 of the cover 40 and the outlet 27 for the hands-free mode is provided in the inner surface 404 of the cover 40. A gain control signal is generated (either in response to a detector 48 or in response to user actuation of the hands-free key 21) when the device is open and not when the device is closed. Thus the device defaults to earpiece mode when the device is closed.

Although devices in which the cover and the body are coupled together in a hinged manner have been described, the invention is also applicable to devices having two housings connected together in other moveable manners, e.g. housings which slide relative to each other.

The present invention may include any novel feature or combination of features disclosed herein either explicitly or implicitly or any generalization thereof irrespective of whether or not it relates to the present claimed invention or mitigates any or all of the problems addressed. In view of the foregoing description it will be evident to a person skilled in the art that various modifications may be made within the scope of the invention. For instance, although a telecommunications device has been described, the invention is applicable to any device in which a transducer is used to provide both the loudspeaker mode and the earpiece mode.

What is claimed is:

1. A portable device comprising:
   a housing having a first surface with at least a first outlet for egress of an acoustic signal when in a loudspeaker mode and a second surface with at least a second outlet for egress of an acoustic signal when in an earpiece mode;
   an electro-acoustic transducer located within the housing for converting an electrical signal input to the transducer into an acoustic signal, the transducer being operable to output acoustic signals when in the loudspeaker mode or the earpiece mode;
   a first acoustical audio path which conducts the acoustical signal as sound waves between the transducer and the first outlet; and
   a second acoustical audio path which conducts an acoustical signal as sound waves between the transducer and the second outlet, wherein the second acoustical audio path is more attenuated than the first acoustical audio path, wherein the attenuation is caused by a physical path limitation of the second acoustical audio path between the transducer and the second outlet, and wherein the transducer is located adjacent to the first outlet.

2. A device according to claim 1, wherein an attenuator is provided between the transducer and the outlet for the egress of the acoustic signal when in the earpiece mode.

3. A device according to claim 2, further comprising an amplifier for amplifying the electrical signal prior to inputting to the transducer and a gain control for controlling the gain of the amplifier, the gain control being operable to increase the gain of the amplifier when the device is to operate in the loudspeaker mode relative to the gain of the amplifier when the device is to operate in the earpiece mode.

4. A device according to claim 2, further comprising:
   a gain control and associated amplifier which amplifies the electrical signal;
   a first housing and a second housing coupled together in a moveable manner; and
   a detector for detecting the position of one housing relative to the other and for operating the gain control in accordance with the position to control gain of the amplifier to control a level of the electrical signal.

5. A device according to claim 4, wherein the difference in gain between the two modes is around 30 dB.

6. A device according to claim 2, wherein the device is a portable communications device.

7. A device according to claim 1, further comprising an amplifier for amplifying the electrical signal prior to inputting to the transducer and a gain control for controlling the gain of the amplifier, the gain control being operable to increase the gain of the amplifier when the device is to operate in the loudspeaker mode relative to the gain of the amplifier when the device is in the earpiece mode.

8. A device according to claim 7, wherein the difference in gain between the two modes is around 30 dB.

9. A device according to claim 8, wherein the device is a portable communications device.

10. A device according to claim 7, further comprising:
    a gain control and associated amplifier which amplifies the electrical signal;
    a first housing and a second housing coupled together in a moveable manner; and
    a detector for detecting the position of one housing relative to the other and for operating the gain control in accordance with the position to control gain of the amplifier to control a level of the electrical signal.

11. A device according to claim 7, wherein the device is a portable communications device.

12. A device according to claim 1, further comprising:
    a gain control and associated amplifier which amplifies the electrical signal;
    a first housing and a second housing coupled together in a moveable manner; and
    a detector for detecting the position of one housing relative to the other and for operating the gain control in accordance with the position to control gain of the amplifier to control a level of the electrical signal.

13. A device according to claim 12, wherein the difference in gain between the two modes is around 30 dB.

14. A device according to claim 12, wherein the device is a portable communications device.

15. A device according to claim 1, wherein the device is a portable communications device.

16. A portable device according to claim 1, wherein both the acoustical audio path which conducts the acoustical signal as sound waves between the transducer and the outlet for the egress of an acoustic signal when in the loudspeaker mode and the acoustical audio path which conducts an acoustical signal as sound waves between the transducer and the outlet for the egress of the acoustical signal when in the earpiece mode are attenuated.

17. A portable device according to claim 1, wherein the acoustical audio path which conducts an acoustical signal as sound waves between the transducer and the outlet for the egress of the acoustical signal when in the earpiece mode is attenuated by the presence of a printed circuit board with at least one aperture for passage of the acoustical signal.

18. A portable device according to claim 1, wherein the acoustical audio path which conducts the acoustical signal as sound waves between the transducer and the outlet for the egress of an acoustic signal when in the loudspeaker mode has a total open area of the outlet for the egress of an acoustic signal when in the loudspeaker mode being greater than the total open area of the outlet for the egress of the acoustical signal when in the earpiece mode of the acoustical audio path which conducts an acoustical signal as sound waves between the transducer and the outlet for the egress of the acoustical signal when in the earpiece mode.

19. A portable telecommunications device comprising:
a housing having a first surface with at least a first outlet for egress of an acoustic signal when in a hands-free mode and a second surface with at least a second outlet for egress of an acoustic signal when in an earpiece mode;
an electro-acoustic transducer located within the housing for converting an electrical signal input to the transducer into an acoustic signal, the transducer being operable to output acoustic signals when in the hands-free mode or in the earpiece mode;
a first acoustical audio path which conducts the acoustical signal as sound waves between the transducer and the first outlet; and
a second acoustical audio path which conducts an acoustical signal as sound waves between the transducer and the second outlet, wherein the second acoustical audio path is more attenuated than the first acoustical audio path, wherein the attenuation is caused by a physical path limitation of the second acoustical audio path between the transducer and the second outlet, and wherein the transducer is located adjacent to the first outlet.

20. A portable device comprising:
a housing having a first surface with a first outlet for egress of an acoustic signal when in a loudspeaker mode and a second surface with a second outlet for egress of an acoustic signal when in the earpiece mode;
an electro-acoustic transducer located within the housing for converting an electrical signal input to the transducer into an acoustic signal;
a first acoustical audio path defined within the housing which conducts the acoustical signal as sound waves between the transducer and the first outlet for the egress of the acoustic signal;
a second acoustical audio path defined within the housing which conducts an acoustical signal as sound waves between the transducer and the second outlet for the egress of the acoustic signal; and
attenuation means within the second acoustical audio path for attenuating the acoustic signal, whereby the acoustic signal egressing from the first outlet has an amplitude that is greater than an amplitude of the acoustic signal egressing from the second outlet, wherein the attenuation means restricts the second acoustical audio path, and wherein the transducer is located adjacent to the first outlet.

21. A device according to claim 20, wherein the attenuation means is a restricted acoustical audio path through an aperture in the printed circuit board.

22. A device according to claim 20, wherein the attenuation means is an acoustic attenuator positioned adjacent to the outlet for the egress of the acoustic signal.

23. A device according to claim 20, wherein the attenuation means is non-variable.

24. A portable device comprising:
a housing having a first surface with an outlet for egress of acoustic signal when in a loudspeaker mode and a second surface with an outlet for egress of an acoustic signal when in an earpiece mode;
an electro-acoustic transducer located within the housing for converting an electrical signal input to the transducer into an acoustic signal, the transducer being operable to output acoustic signals when in the loudspeaker mode or the earpiece mode, the audio path between the transducer and the outlet for the egress of an acoustic signal when in the loudspeaker mode being less attenuated than the audio path between the transducer and the outlet for the egress of an acoustic signal when in the earpiece mode;
an amplifier for amplifying the electrical signal prior to inputting to the transducer and a gain control for controlling the gain of the amplifier, the gain control being operable to increase the gain of the amplifier when the device is to operate in the loudspeaker mode relative to the gain of the amplifier when the device is in the earpiece mode;
a gain control and associated amplifier which amplifies the electrical signal;
a first housing and a second housing coupled together in a moveable manner; and
a detector for detecting the position of one housing relative to the other and for operating the gain control in accordance with the position to control gain of the amplifier to control a level of the electrical signal; and wherein the difference in gain between the two modes is about 30 dB.

25. A portable device comprising:
a housing having a first surface with at least a first outlet for egress of an acoustic signal when in a loudspeaker mode and a second surface with at least a second outlet for egress of an acoustic signal when in an earpiece mode;
an electro-acoustic transducer located within the housing for converting an electrical signal input to the transducer into an acoustic signal, the transducer being operable to output acoustic signals when in the loudspeaker mode or the earpiece mode;
a first acoustical audio path which conducts the acoustical signal as sound waves between the transducer and the first outlet; and
a second acoustical audio path which conducts an acoustical signal as sound waves between the transducer and the second outlet, wherein the second acoustical audio path is more attenuated than the first acoustical audio path, and wherein the attenuation is caused by a physical path limitation of the second acoustical audio path between the transducer and the second outlet.

26. A portable device according to claim 25, wherein the physical path limitation is defined by the acoustical audio path between the transducer and the outlet for the egress of the acoustical signal when in the earpiece mode.

27. A portable device according to claim 25, wherein the physical path limitation is an attenuator provided between the transducer and the outlet for the egress of the acoustic signal when in the earpiece mode.

28. A device according to claim 25, wherein the physical path limitation is a permanent restriction in the acoustical audio path.

29. A device according to claim 25, wherein the physical path limitation is non-variable.

* * * * *